May 25, 1954 — A. O. SODERHOLM — 2,679,133
NUT HARVESTING MACHINE
Filed Jan. 7, 1952 — 4 Sheets-Sheet 1

INVENTOR.
AXEL O. SODERHOLM
BY
ATTORNEY

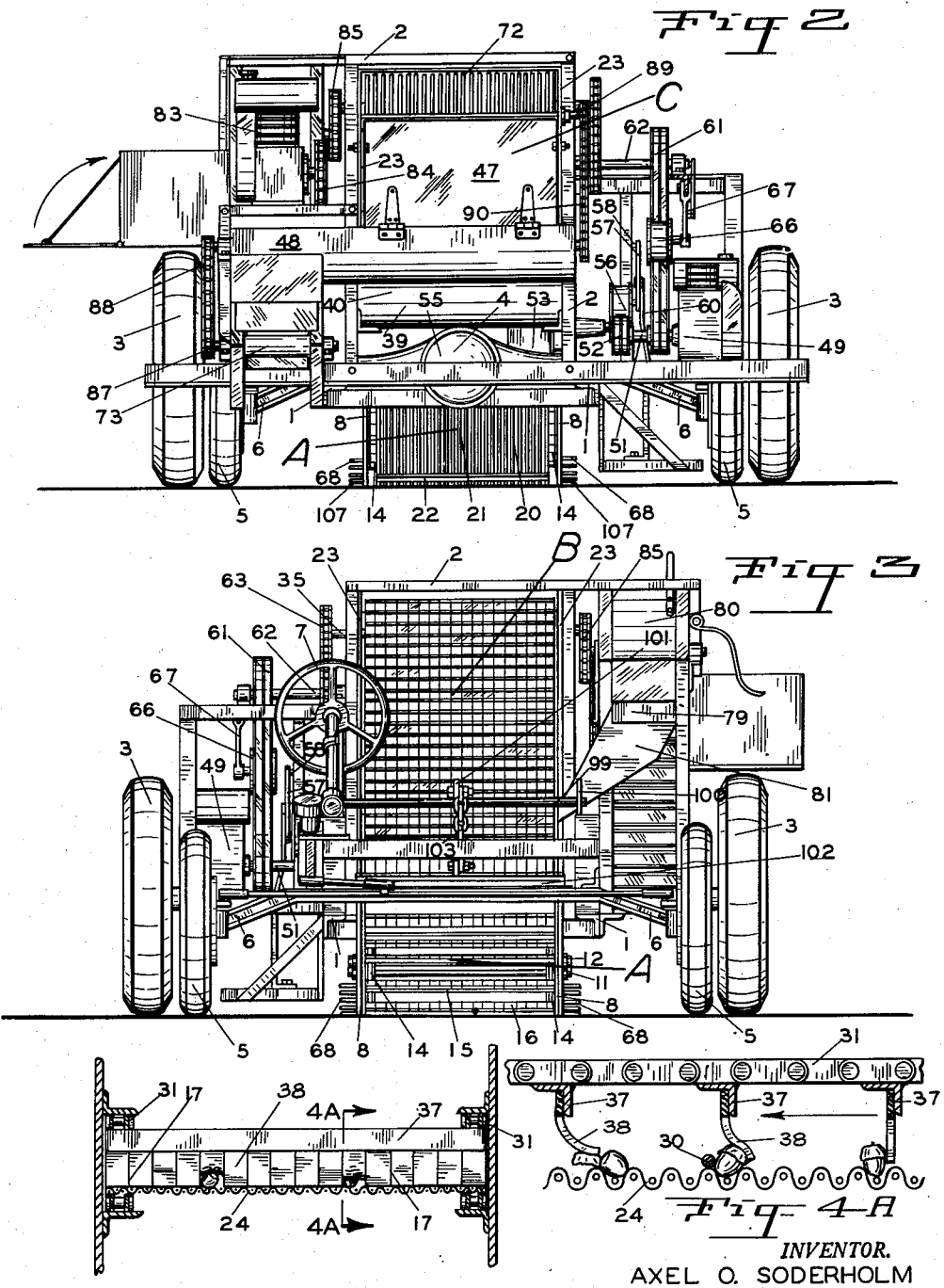

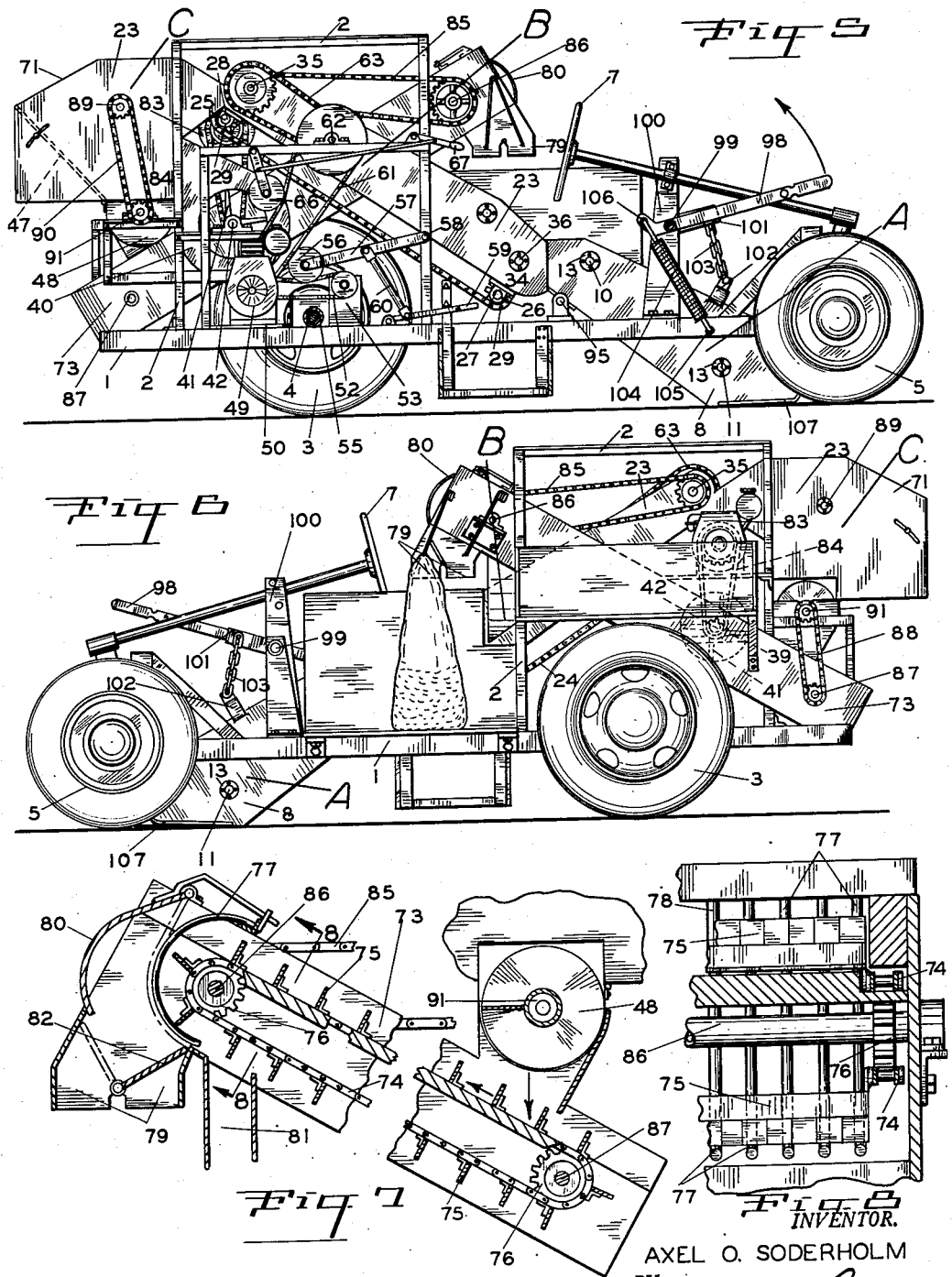

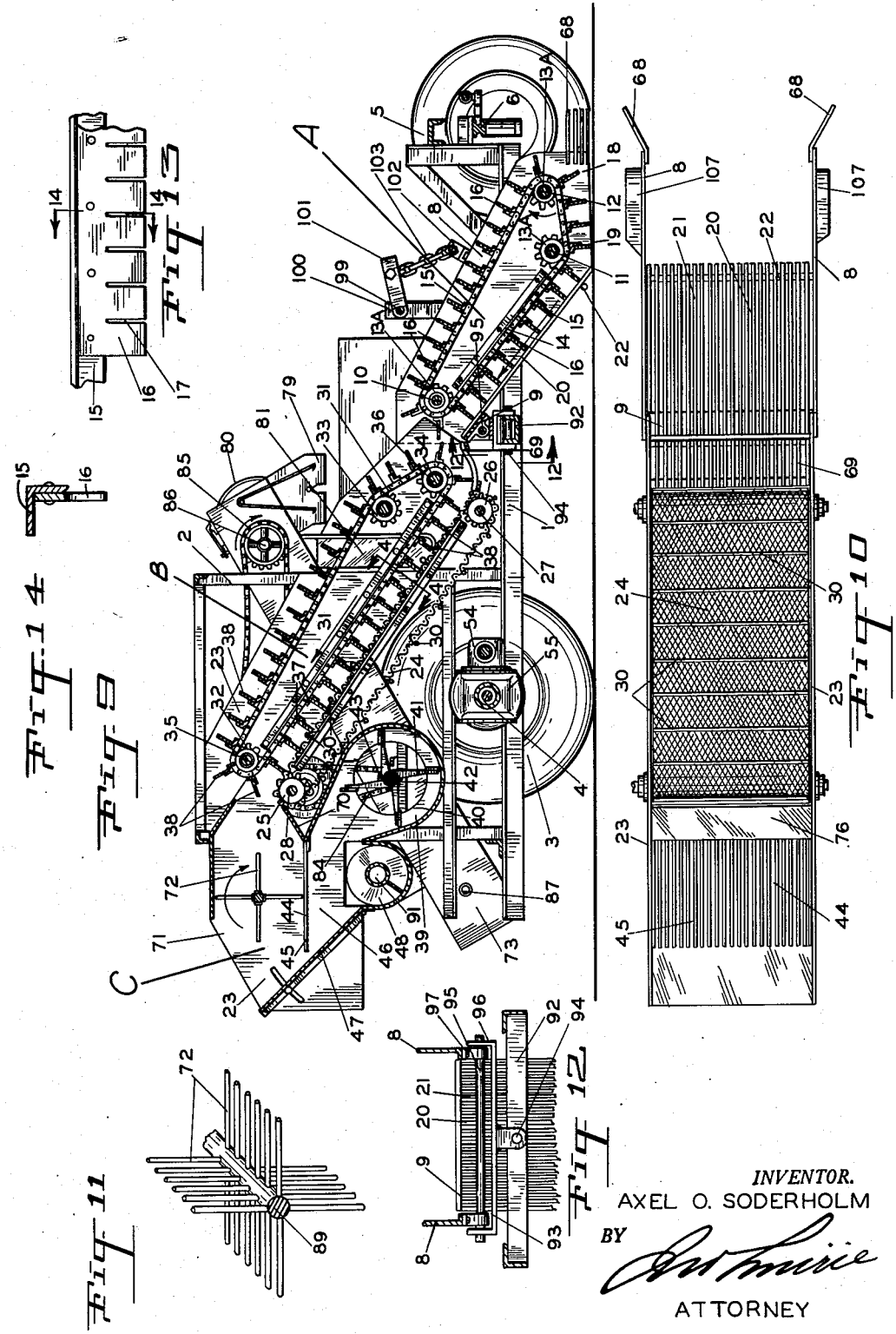

Patented May 25, 1954

2,679,133

UNITED STATES PATENT OFFICE 2,679,133

NUT HARVESTING MACHINE

Axel O. Soderholm, Hubbard, Oreg.

Application January 7, 1952, Serial No. 265,324

1 Claim. (Cl. 56—328)

My invention relates to a nut gathering and husking machine, which is particularly adapted for the harvesting of filberts.

The primary object of my invention is to gather the nuts from windrows, remove their husks and separate the light materials and culls from the nuts, then deliver the same into sacks carried by the machine.

A further object of my invention is the building of a machine for gathering, husking and cleaning nuts that is compact, making it easy to maneuver in the orchard and under its own power.

These and other incidental objects will be apparent in the drawings, specification and claim.

Referring to the drawings:

Figure 2 is a rear view of Figure 1.

Figure 3 is a front view of Figure 1.

Figure 4 is an enlarged detail fragmentary view of the husking belts, taken on line 4—4 of Figure 9.

Figure 4A is a detail sectional view, taken on line 4A—4A of Figure 4.

Figure 5 is a side view, taken on line 5—5 of Figure 1, particularly made to illustrate the power transmission system.

Figure 6 is a view from the opposite side of the machine.

Figure 7 is an enlarged fragmentary sectional detail of the conveyor for delivering the nuts to the sacking station, taken on line 7—7 of Figure 1.

Figure 8 is an enlarged fragmentary detail sectional view, taken on line 8—8 of Figure 7.

Figure 9 is a side elevational view, similar to Figure 5, but with parts broken away and shown in section so as to show the general construction of the gathering, husking and cleaning units.

Figure 10 is a plan view of the dirt removing screens, husking conveyor belt, together with the trash removing screen.

Figure 11 is a perspective fragmentary detail view of the reel for preventing the nuts from passing out with the lighter materials.

Figure 12 is a fragmentary detail sectional view, taken on line 12—12 of Figure 9.

Figure 13 is an enlarged detail fragmentary view of the pickup conveyor fingers and their relation to the supporting cross bars.

Figure 14 is a sectional view, taken on line 14—14 of Figure 13.

Figure 1:
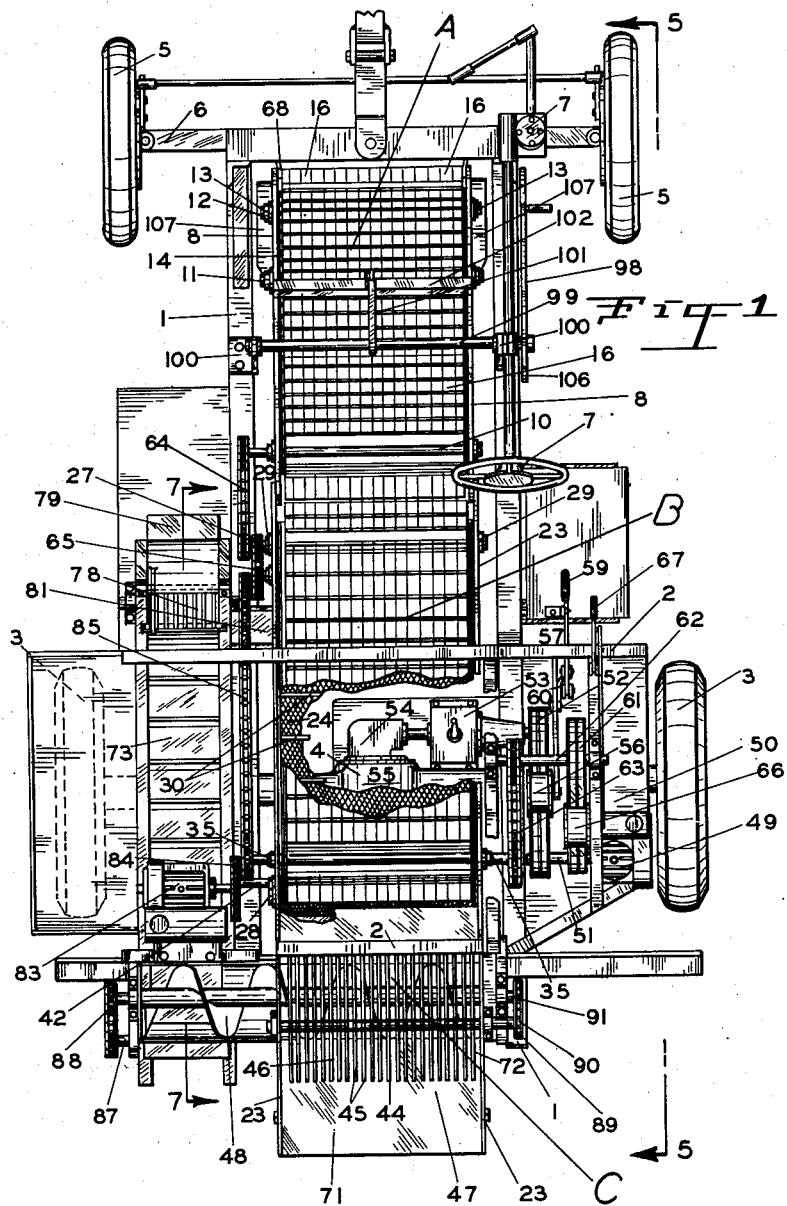
Figure 1 is a plan view of my new and improved nut gathering, husking and cleaning machine with parts broken away.

Referring more specifically to the drawings:

My new and improved nut gathering and husking machine consists of three major units. First the gathering unit A, consisting of a gathering belt and dirt removing screen; a husking unit B, consisting of a husking screen belt and a conveyor belt; the third unit C, which consists of a blower unit for removing the trash.

All of these units are mounted to a base frame 1, having a superstructural framework 2. The base frame is mounted to the supporting and driving wheels 3 by way of the differential axle 4. The forward end of the frame 1 is mounted upon the wheels 5, which are journalled to the cross beam 6. These wheels are steerable by the usual steering mechanism associated with the steering wheel 7.

I will first describe the gathering scoop A, which consists of side frames or plates 8, which are spaced apart by the spreader bar 9 at their upper ends and the spreader bar 22 at their lower ends, as well as being spaced apart by the cross shafts 10, 11 and 12. These cross shafts are journalled in bearings 13, and have sprockets 13A keyed thereto about which the conveyor chain 14 is trained. The conveyor chain 14 has transverse angle bars 15 fixedly secured to the said chains.

Flat flexible fingers 16, preferably of a rubber material are fixedly secured to the cross bars 15, as best illustrated in Figures 13 and 14. The flat material is slitted at 17, which creates the flexible fingers 16 while the solid portion of the material is riveted or otherwise secured to the cross bars 15.

I have found in operation that it is advisable to raise the forward shaft 12 above the shaft 11, creating a space 18 into which the nuts enter on the forward movement of the scoop. The tips of the fingers 16 approaching the nuts and ground surface at 19, scrape or rake the nuts from the said ground surface onto the screen 20, consisting of bars 21 running parallel to each other and longitudinally of the direction of movement of the mobile support. These bars are secured to the spreader bar 9 at their upper ends and to the spreader bar 22 at their lower ends. The screen 20 does not pass the nuts but permits the passage and discharge of dirt and loose solid materials from the nuts being gathered.

The husking unit B consists of side frames 23, secured to the framework 2. The frames 23 extend to the rear of the machine encasing the cleaning unit C as well. The husking unit consists of a belt screen 24 trained about the sprockets 25 and 26, which in turn are keyed to the cross shafts 27 at 28, journalled within bearings 29 which are fixedly secured to the side frames 23 in the usual manner. The screen 24 has transverse rods or bars 30 fixedly secured thereto which assist in the husking of the nuts.

Chains 31 are trained about sprockets 32, 33 and 34, which are keyed to the cross shafts 35 and 36, which are journalled within the bearings 13. The chains 31, as best shown in Figures 4 and 4A, have cross bars 37 fixedly mounted thereon which carry the fingers 38. The cross bar and finger construction in this chain assembly is identical to that of the pick-up fingers 16, as illustrated in Figures 13 and 14. The detail operation of this husking unit will be described later.

I will now describe the cleaning unit C. The cleaning unit C includes a blower fan 39 having a housing 40 and blade assembly 41 mounted to the shaft 42, which is journalled within bearings 43 in the usual manner. A screen 44 consisting of spaced parallel rods 45 is mounted across the nozzle 46 of the blower unit as best illustrated in Figures 9 and 10. The nuts are delivered from the husking unit on to the screen 44, after which they are delivered by the chute 47 into the screw conveyor 48, which will deliver them to the sacking unit to be described later.

I will now describe the operation of my new and improved nut gathering, husking and cleaning machine. A power plant or motor 49 is mounted to the platform 50 and is adapted to operate the above described units A and B. It is also adapted to move the machine over the ground surface. Referring to Figures 1, 2 and 5, the motor shaft 51 drives the V-belts 52, which in turn drive the transmission 53, the forty-five degree gear unit 54, which leads to the differential gear box 55.

The V-belts are brought into operation by the tightener pulley 56, referring to Figure 5, and the lever 57, which is pivoted at 58 to the framework 2. The lever 57 is operated by the hand lever 59 and the link 60. The machine can be moved either forward or backwards by the transmission 53 at various speeds.

The conveyor chain 14, the husking screen 24 and the conveyor chain 31 are driven from the motor 49 by way of the V-belts 61, which drive the countershaft 62, referring to Figures 1 and 5. The shaft 35 of the conveyor chain 31 is driven from the countershaft 62 by the chain 63. The shaft 34 of the conveyor chain 31 is adapted to drive the shaft 10 of the gathering chain 14 by way of the chain 64. The shaft 34 also drives the shaft 27 of the husking screen 24 by way of the chain 65, referring to Figure 1.

The husking screen 24 is adapted to travel at a relatively slow rate of speed in comparison to the fingers 38 so that the nuts will be rolled over the surface of the husking screen as indicated in Figure 4A, thereby removing the husks from the nut, although I do not wish to be limited to using a driven screen 24, as I have had excellent results with a stationary screen over which the nuts are rolled by the fingers 38.

The gathering fingers 16, the husking screen 24 and the gathering fingers 38 are set in motion by the belt tightener pulley 66 being tightened against the V-belt 61 by the lever control 67, referring to Figure 5. As the machine moves forward the fingers 68, formed on the side members 8 of the gathering scoop, direct the windrows of nuts into the space 18 under the fingers 16 where they are picked up by the said fingers, carried over the screen 20 where the dirt falls through, delivered on to the stationary screen 69 mounted to the forward end of the husking unit B. The fingers 38 of the husking unit pick up the nuts at this point, together with the lighter materials, forcing them over the surface of the husking screen 24, which as stated above, the said husking screen travels at a much less rate of speed, therefore the nuts are rolled over the screen and the cross bars 30 by the fingers 38 removing the husks therefrom.

When the nuts reach the point of delivery from the screen 24, they land on the screen 44 by way of the chute 70. The blower blades 41 deliver air through the nozzle 46 of the blower unit up through the screen 44. This separates leaves and light material from the nuts, blowing the same out the opening 71. To prevent the whole nuts from being blown out with the lighter material, a revolving screen 72 is rotated in the path of the air stream from the blower blades 41, as best illustrated in Figure 9. The light or cull nuts are blown out the opening 71 with the lighter material, providing a separation from the whole nuts.

The nuts are delivered from the screen 44 on to the chute 47 and into the screw conveyor 48 and delivered into the conveyor 73, which has a conveyor chain 74 with cross blades 75 trained about the sprockets 76. A screen unit 77, consisting of semi-circular bars 78 helps to prevent leaves, if any, from passing through into the delivery spouts 79. A solid cap 80 is provided for capping the screen 77, preventing the nuts from entering the delivery spout 79.

In case the cleaning has not been completed, the nuts can be delivered through the spout 81 back to the husking screen or belt 24. The usual by-pass chute 82 is provided for transferring the bags in the filling operation from one delivery spout to the other. The shaft 42 of the blower blades 41 is driven from the auxiliary motor 83 by way of the chain 84. The chain 74 within the conveyor 73 is driven from the shaft 35 by way of the chain 85, which drives the upper shaft 86 of the said conveyor 73. The screw conveyor 48 is driven by the shaft 87 of the conveyor 73 by the chain 88, while the shaft 89 of the rotating screen 72 is driven by the chain 90 from the shaft 91 of the screw conveyor.

I will now describe the method of mounting the conveyor scoop A to the machine so that the same can adapt itself to the contour of the ground surface, and also so that it can be raised and lowered out of and into operating position. Referring to Figures 1, 5, 9 and 12, the upper end of the scoop assembly is pivotally mounted to the cross member 92 of the frame 1 by the universal member 93, which is pivotally mounted to the cross member 92 at 94, and to the cross shaft 95 at 96, the cross shaft 95 being clamped to the underside of the said frames 8 by the clamps 97. This permits the scoop to be raised and lowered and also to pivot about the longitudinal line of the machine, levelling itself on the ground surface.

The scoop is raised and lowered by the lever 98, which is keyed to the cross shaft 99, the said shaft being journalled in upwardly extending brackets 100. A crank 101 is fixedly secured to the shaft 99 at its one end, and is connected to the cross bar 102 by way of the chain 103 at its opposite end. The cross bar being fixedly secured to the side plates of the scoop. A spring 104 connects to the frame 1 at 105 and to the lever 98 at 106 offsetting the weight of the forward end of the scoop while the scoop is in running position.

When it is desired to raise the forward end of the scoop, the lever 98, Figure 5, is moved in the direction of the arrow past the cross shaft 99 where it will remain until loosened. Shoes 107 are fixedly mounted to the forward end of the scoop and ride over the ground surface supporting the said scoop.

What I claim is:

A nut harvesting machine comprising a mobile support including a main frame, a gathering unit on the front of said frame and including an inclined screen and a pick-up conveyor, said screen being positioned with its lower, forward end substantially at ground level and being adapted to support nuts and having openings for discharging dirt and refuse, said pick-up conveyor comprising an endless support movably mounted above said screen and having cross-bars extending perpendicularly therefrom with the free edges of said cross-bars immediately adjacent said screen to engage and drag nuts along said screen, the front end of said pick-up conveyor extending beyond the lower front end of said screen with said cross-bars extending substantially to ground level to rake nuts up onto said screen, said gathering unit comprising a subframe universally mounted at its rear end to said main frame, a crank shaft journalled on said main frame above said gathering unit, a crank handle and a crank arm on said crank shaft, a connection between said crank arm and said sub-frame for varying the elevation of said sub-frame by operation of said crank handle, a spring between said crank handle and said main frame for counterbalancing said sub-frame, ground runners at the forward end of said sub-frame, said inclined screen comprising a grill composed of spaced longitudinally disposed rods carried by said sub-frame, said pick-up conveyor being mounted in said sub-frame and said cross-bars being movable along the upper side of said screen, the front end of said pick-up conveyor being trained about sprockets which are disposed immediately in front of said grill and at a level at which the free edges of said conveyor cross-bars are substantially level with the bottom of said ground runners, said cross-bars comprising rigid bars extending perpendicularly from said support and flexible fingers carried by said cross-bars and extending beyond the free edges of said cross-bars.

References Cited in the file of this patent

UNITED STATES PATENTS

| Number | Name | Date |
|---|---|---|
| 567,372 | Beach | Sept. 8, 1896 |
| 612,744 | Methven et al. | Oct. 18, 1898 |
| 1,200,092 | Elliott et al. | Oct. 3, 1916 |
| 1,540,955 | Ross | June 9, 1925 |
| 1,564,914 | Vaughan | Dec. 8, 1925 |
| 1,907,467 | Tervo et al. | May 9, 1933 |
| 2,031,810 | Anderson | Feb. 25, 1936 |
| 2,052,718 | Maiers | Sept. 1, 1936 |
| 2,172,507 | Grignolo | Sept. 12, 1939 |
| 2,230,139 | Gustin | Jan. 28, 1941 |
| 2,388,454 | Weeth et al. | Nov. 6, 1945 |
| 2,514,945 | Fortier | July 11, 1950 |
| 2,529,620 | Marnach et al. | Nov. 14, 1950 |
| 2,562,775 | Crull | July 31, 1951 |
| 2,643,754 | Doak | June 20, 1953 |